United States Patent
Taniguchi et al.

(10) Patent No.: US 12,133,828 B2
(45) Date of Patent: Nov. 5, 2024

(54) MOBILITY SUPPORT DEVICE, INFORMATION PROCESSING METHOD, AND STORAGE MEDIUM

(71) Applicant: TOYOTA JIDOSHA KABUSHIKI KAISHA, Aichi-ken (JP)

(72) Inventors: Mashio Taniguchi, Toyota (JP); Hiroaki Kawamura, Toyota (JP); Yukiko Ohnishi, Toyota (JP); Mariko Higuchi, Toyota (JP); Masatoshi Kakutani, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 146 days.

(21) Appl. No.: 17/847,084

(22) Filed: Jun. 22, 2022

(65) Prior Publication Data
US 2023/0058208 A1 Feb. 23, 2023

(30) Foreign Application Priority Data
Aug. 17, 2021 (JP) .................. 2021-132775

(51) Int. Cl.
| | |
|---|---|
| *A61H 3/06* | (2006.01) |
| *G08G 1/16* | (2006.01) |
| *G09B 21/00* | (2006.01) |
| *H04W 4/02* | (2018.01) |
| *H04W 4/024* | (2018.01) |
| *H04W 4/80* | (2018.01) |
| *H04W 4/90* | (2018.01) |
| *H04W 12/50* | (2021.01) |

(52) U.S. Cl.
CPC .............. *A61H 3/061* (2013.01); *G08G 1/161* (2013.01); *G08G 1/166* (2013.01); *G09B 21/007* (2013.01); *H04W 4/023* (2013.01); *H04W 4/024* (2018.02); *H04W 4/80* (2018.02); *H04W 4/90* (2018.02); *H04W 12/50* (2021.01); *A61H 2003/063* (2013.01)

(58) Field of Classification Search
CPC .............. A61H 3/061; A61H 2003/063; G08G 1/161; H04W 4/023; H04W 4/80; H04W 4/90; H04W 12/50
See application file for complete search history.

(56) References Cited

U.S. PATENT DOCUMENTS

2019/0307632 A1 10/2019 Yashiro et al.
2021/0099834 A1* 4/2021 Mountford ............ H04W 4/023

FOREIGN PATENT DOCUMENTS

KR 101268486 * 12/2011 ............... G01S 1/08
WO 2018025531 A1 2/2018

* cited by examiner

*Primary Examiner* — Hongmin Fan
(74) *Attorney, Agent, or Firm* — HAUPTMAN HAM, LLP (57) ABSTRACT

In a mobility support device, an external device that is present on a moving route of a user who is a target of support is identified based on a set moving plan, and first communication means that enables direct communication between the identified external device and a white cane carried by the user is established. Then, support information for supporting mobility of the user is generated based on information received from the external device by the first communication means, and the generated support information is output to an output device.

9 Claims, 4 Drawing Sheets

FIG. 4

MOBILITY SUPPORT DEVICE, INFORMATION PROCESSING METHOD, AND STORAGE MEDIUM

CROSS-REFERENCE TO RELATED APPLICATION

This application claims priority to Japanese Patent Application No. 2021-132775 filed on Aug. 17, 2021, incorporated herein by reference in its entirety.

BACKGROUND

1. Technical Field

The present disclosure relates to a mobility support device, an information processing method, and a storage medium.

2. Description of Related Art

WO 2018/025531 discloses a mobility support device that supports walking of a visually impaired person who acts without using vision. In the mobility support device, the direction to be crossed is captured in advance from the front of the pedestrian crossing present on the route, and the captured still image and the position information acquired by a global positioning system (GPS) sensor are stored. Then, when a visually impaired person is determined to cross the pedestrian crossing based on the position information acquired by the GPS sensor, a displacement in the direction is calculated by executing a matching process with a still image captured while the visually impaired person is walking based on the still image of the direction in which the visually impaired person desires to cross that is stored (registered), and the direction in which the visually impaired person should walk is guided.

SUMMARY

The technique described in the above-mentioned WO 2018/025531 is limited to support provided when a user who is a target of the support walks on the pedestrian crossing. Therefore, support on the assumption of various situations predicted before the user arrives at the destination cannot be effectively provided. Therefore, the above-mentioned related art has room for improvement in this respect.

In consideration of the fact above, an object of the present disclosure is to provide a mobility support device, an information processing method, and a storage medium capable of efficiently supporting mobility of a user on the assumption of various situations.

A mobility support device according to the present disclosure indicated in at least one embodiment includes: a device identification unit that identifies an external device that is present on a moving route of a user who is a target of support based on a set moving plan; a pairing unit that establishes first communication means that enables direct communication between the identified external device and a portable device carried by the user; a support information generation unit that generates support information for supporting mobility of the user based on information received from the external device by the first communication means; and an output unit that outputs the generated support information to an output device connected to the portable device by a wired method or a wireless method.

In the mobility support device according to the present disclosure indicated in at least one embodiment, the external device that is present on the moving route of the user who is the target of the support based on the set moving plan is identified, and the first communication means that enables direct communication between the identified external device and the portable device carried by the user is established. Then, the support information for supporting mobility of the user is generated based on the information received from the external device by the first communication means, and is output to the output device. For example, it is possible to generate the support information by directly receiving the information corresponding to the contents of the support from the external device installed at a location where the support for the user is required on the moving route of the user. With the above, it is possible to efficiently support mobility of the user on the assumption of various situations.

In the mobility support device according to at least one embodiment, in the configuration according to at least one embodiment, the first communication means is short-range wireless communication means; and the pairing unit establishes the first communication means with the external device that is present within a predetermined distance from the portable device.

In the mobility support device according to at least one embodiment, the communication means by the short-range wireless communication means is established between the external device and the portable device, and direct communication is performed with the external device present within the predetermined distance from the portable device. With the above, the support information can be generated at the point where the user approaches the external device, whereby mobility of the user can be supported at the optimum timing.

In the mobility support device according to at least one embodiment, in the configuration according to at least one embodiment, the pairing unit establishes the first communication means when the portable device cannot establish second communication means that enables communication via a base station.

In the mobility support device according to at least one embodiment, the first communication means is established when the portable device cannot establish second communication means that enables communication via a base station. For example, the communication means via the base station is communication means capable of connecting to a public network via the base station corresponding to communication standards such as the fifth generation (5G), long term evolution (LTE), LTE-Advanced (fourth generation (4G)), and the third generation (3G). That is, when the portable device cannot use the public network, inter-device direct communication is performed and the support information is generated. As a result, it is possible to efficiently support mobility of the user on the assumption of a situation where the radio wave of the base station is difficult to receive, such as when the destination or the moving route of the user is underground.

In the mobility support device according to at least one embodiment, in the configuration according to at least one embodiment, the pairing unit establishes the first communication means with the external device when a device related to another moving route is present around the external device present on the moving route of the user.

In the mobility support device according to at least one embodiment, direct communication with the external device is established when the device related to the other moving route is present around the external device present on the moving route of the user. Therefore, for example, when the moving route of the user includes a point that intersects with the other moving route, the support information can be generated by directly communicating with the external device corresponding to the moving route of the user. As a result, it is possible to efficiently support mobility of the user on the assumption of a situation where the user tends to take an erroneous route in the moving route.

In the mobility support device according to at least one embodiment, in the configuration according to at least one embodiment, the external device includes a device mounted on a vehicle traveling along the moving route of the user, and the support information generation unit is configured to be able to generate the support information for supporting the user when the user gets on or off the vehicle.

In the mobility support device according to at least one embodiment, direct communication is established between the external device mounted on the vehicle traveling along the moving route of the user and the portable device, and support information for supporting the user when the user gets on or off the vehicle can be generated. Therefore, for example, it is possible to efficiently support mobility of the user on the assumption of a situation where the user moves using a vehicle of public transportation such as a bus or a train or a taxi.

In the mobility support device according to at least one embodiment, in the configuration according to at least one embodiment, the portable device is a white cane carried by a visually impaired person, and the support information generation unit generates the support information for supporting mobility of the visually impaired person.

In the mobility support device according to at least one embodiment, direct communication between the white cane carried by the visually impaired person and the external device is established, and support information for supporting mobility of the visually impaired person is generated. With the above, it is possible to efficiently support mobility of the visually impaired person on the assumption of various situations accompanied by mobility of the visually impaired person.

The mobility support device according to at least one embodiment further includes, in the configuration according to at least one embodiment, a user information transmission unit that transmits information related to the user to the external device when the first communication means is established.

In the mobility support device according to at least one embodiment, when direct communication between the portable device and the external device is established, the information related to the user is transmitted to the external device. With the above, it is possible to notify the external device that the user who is the target of mobility support is a visually impaired person. Therefore, it becomes possible to give consideration to mobility of the user via the external device based on the transmitted information.

In the mobility support device according to at least one embodiment, in the configuration according to at least one embodiment, the first communication means is communication means that enables the direct communication between the external device and the portable device using a link key being unique identification information exchanged between the external device and the portable device and stored in both of the external device and the portable device, and the mobility support device further includes a deletion unit that deletes the link key stored in the portable device after the user arrives at a destination based on the moving plan.

In the mobility support device according to at least one embodiment, inter-device direct communication is enabled using the link key being the unique identification information exchanged between the external device and the portable device and stored in both of the external device and the portable device. Then, after the user arrives at the destination based on the moving plan, the link key stored in the portable device is deleted. With the above, it is possible to suppress automatic connection to the external device on the route used in the past while the user is moving along the set moving route, whereby mobility of the user can be effectively supported.

An information processing method according to at least one embodiment includes: identifying an external device that is present on a moving route of a user who is a target of support based on a set moving plan; establishing first communication means that enables direct communication between the identified external device and a portable device carried by the user; generating support information for supporting mobility of the user based on information received from the external device by the first communication means; and outputting the generated support information to an output device connected to the portable device by a wired method or a wireless method.

In the information processing method according to at least one embodiment, it is possible to efficiently support mobility of the user on the assumption of various situations, as described above.

A storage medium according to at least one embodiment stores a program that causes a computer to: identify an external device that is present on a moving route of a user who is a target of support based on a set moving plan; establish first communication means that enables direct communication between the identified external device and a portable device carried by the user; generate support information for supporting mobility of the user based on information received from the external device by the first communication means; and output the generated support information to an output device connected to the portable device by a wired method or a wireless method.

In the program stored in the storage medium according to at least one embodiment, it is possible to efficiently support mobility of the user on the assumption of various situations.

As described above, according to the mobility support device, the information processing method, and the storage medium according to the present disclosure, it is possible to efficiently support mobility of the user on the assumption of various situations.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a mobility support device 10 according to the present embodiment will be described with reference to FIGS. 1 to 5. In the present embodiment, as an example, the mobility support device 10 is mounted on a white cane 1 carried by a visually impaired person. The white cane 1 is an example of a "portable device" according to the present disclosure.

Figure 1:
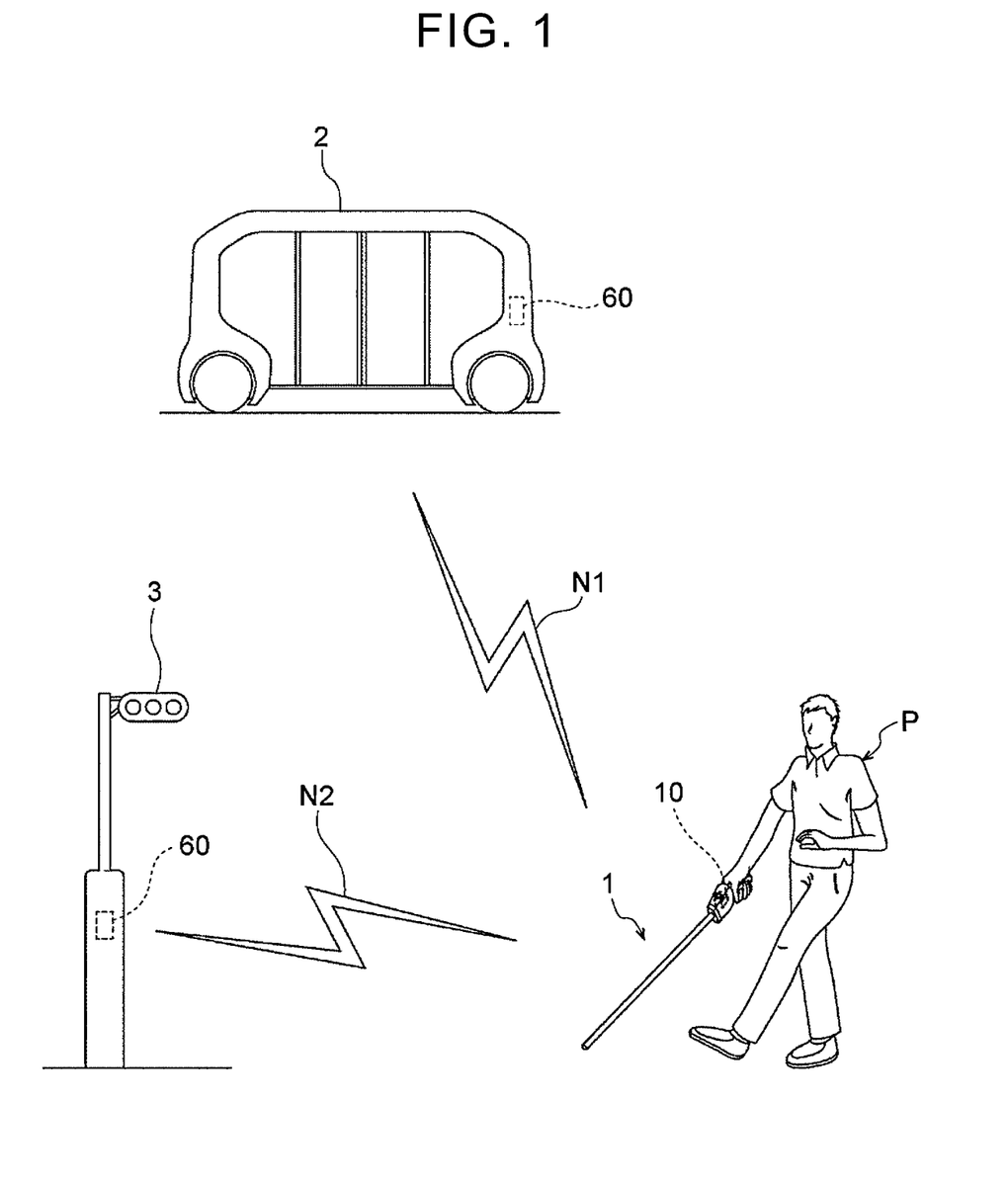
FIG. 1 is a diagram showing an example of direct communication performed between a white cane as a portable device and external devices according to the present embodiment.

As shown in FIG. 1, the mobility support device 10 establishes communication means N1, N2 (first communication means) that enable direct communication between the white cane 1 carried by a visually impaired user P and each external device 60 present on a moving route of the user P, and provides support information for supporting mobility of the user P based on information received from each external device 60. In FIG. 1, as an example of "the external device present on the moving route", the external device 60 mounted on a vehicle 2 that moves along the moving route of the user P and the external device 60 mounted on a traffic light 3 installed on the moving route of the user P are shown.

Figure 2:
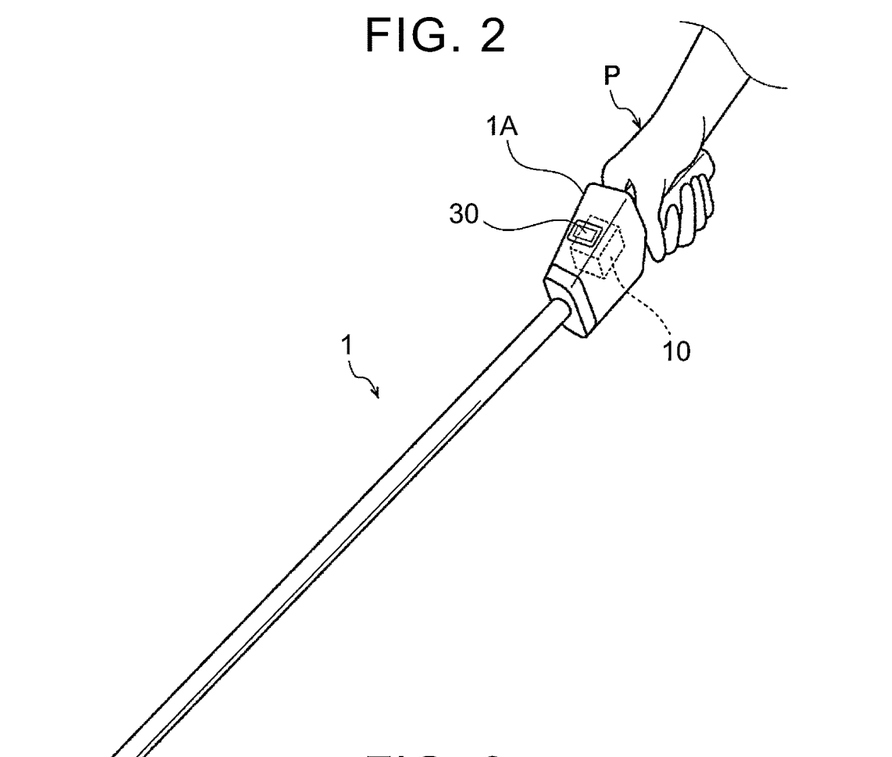
FIG. 2 is an enlarged view of the white cane according to the present embodiment.

As shown in FIG. 2, the mobility support device 10 is mounted on the white cane 1. The white cane 1 includes a grip portion 1A gripped by the target user P. A camera is installed in the grip portion 1A while facing toward the front side of the user P such that the traveling direction of the user P can be captured.

Hardware Configuration of Mobility Support Device 10

Figure 3:
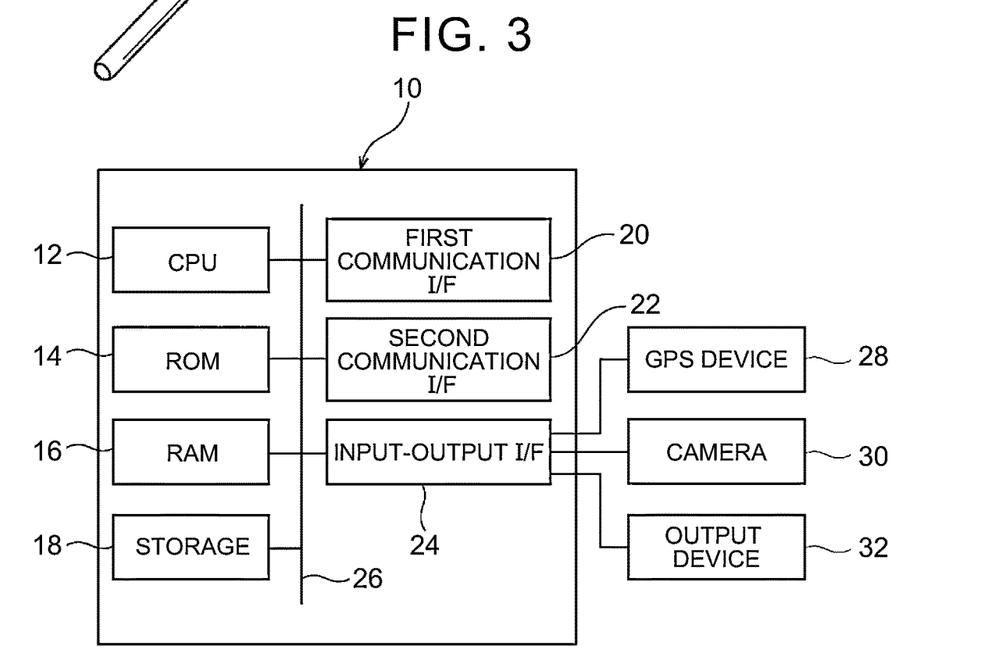
FIG. 3 is a block diagram showing a hardware configuration of a mobility support device according to the present embodiment.

FIG. 3 is a block diagram showing a hardware configuration of the mobility support device 10. As shown in FIG. 3, the mobility support device 10 is configured to include a central processing unit (CPU: processor) 12, a read-only memory (ROM) 14, a random access memory (RAM) 16, a storage 18, a first communication interface 20, a second communication interface 22, and an input-output interface 24. Each configuration is communicably connected to each other via an internal bus 26.

The CPU 12 is a central processing unit that executes various programs and that controls various units. That is, the CPU 12 reads the program from the ROM 14 or the storage 18 and executes the program using the RAM 16 as a work area. The CPU 12 controls each of the above configurations and executes various arithmetic processes in accordance with the program recorded in the ROM 14 or the storage 18.

The ROM 14 stores various programs and various data. The RAM 16 temporarily stores a program or data as a work area. The storage 18 is composed of a hard disk drive (HDD) or a solid state drive (SSD), and stores various programs including an operating system and various data. Further, the storage 18 according to the present embodiment stores a plurality of moving plans registered in advance by the user P as a moving plan from a predetermined departure point to a destination, and a link key exchanged between the mobility support device 10 and the external device 60 so as to establish direct communication between the mobility support device 10 and the external device 60.

The first communication interface 20 is an interface for the mobility support device 10 to communicate with other devices, and, for example, mobile communications such as the fifth generation (5G), long term evolution (LTE), LTE-Advanced (fourth generation (4G)), and the third generation (3G) and standards such as Wi-Fi (registered trademark) are used for the first communication interface 20. The first communication interface 20 enables communication between the mobility support device 10 and the other devices using communication means (second communication means) via a base station of a carrier or the like. The mobility support device 10 can be connected to a public network such as the Internet via the base station in accordance with the standard used for the first communication interface 20.

The second communication interface 22 is an interface for establishing the communication means (first communication means) through which the mobility support device 10 and other communication devices directly communicate with each other. In the present embodiment, Bluetooth (registered trademark) that is the standard for short-range wireless communication means is used. The mobility support device 10 establishes direct communication between the mobility support device 10 and the external device 60 in accordance with the standard used for the first communication interface 20.

The input-output interface 24 is an interface for connecting an external device to the mobility support device 10, and is connected to a global positioning system (GPS) device 28, the camera 30, and an output device 32 mounted on the white cane 1. The GPS device 28 acquires the position information of the white cane 1. The output device 32 is configured to include, for example, at least one of a speaker and a vibrating element. In addition to this, an operation unit (not shown) is connected to the input-output interface 24. The operation unit is provided on the white cane 1 for starting and stopping the camera 30, setting the moving plan of the user P, turning on and off the power supply, turning on and off the Bluetooth function, and the like. Further, a radar, light detection and ranging (LIDAR), or the like may be connected to the input-output interface 24 as a sensor for detecting obstacles around the user P as necessary.

Functional Configuration of Mobility Support Device 10

The mobility support device 10 realizes various functions using the above hardware resources. The functional configuration realized by the mobility support device 10 will be described with reference to FIG. 4.

Figure 4:
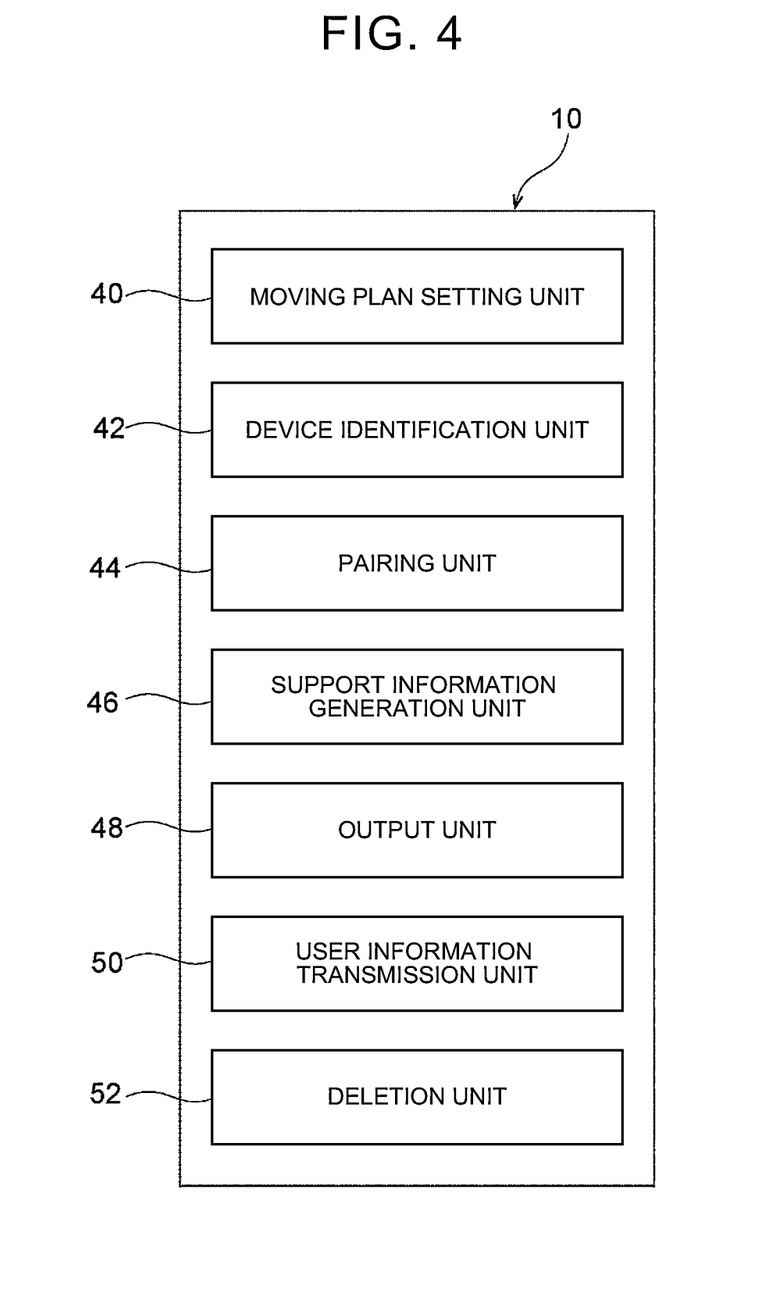
FIG. 4 is a block diagram showing a hardware configuration of a mobility support device according to the present embodiment.

As shown in FIG. 4, the mobility support device 10 is configured to include a moving plan setting unit 40, a device identification unit 42, a pairing unit 44, a support information generation unit 46, an output unit 48, and a user information transmission unit 50, and a deletion unit 52 as functional configurations. Note that, each functional configuration is realized as the CPU 12 reads and executes the program stored in the ROM 14 or the storage 18.

The moving plan setting unit 40 sets a predetermined moving plan selected by the operation of the user P from the moving plans registered (stored) in advance in the mobility support device 10. Note that, the moving plan includes information related to the moving route from the current position of the user P to the destination and information related to the link key that is unique identification information for identifying the external device 60 present on the moving route.

The device identification unit 42 identifies the external device 60 present on the moving route of the user P based on the moving plan set by the moving plan setting unit 40. Specifically, the device identification unit 42 identifies the external device 60 present on the moving route of the user P by acquiring the information related to the link key of the external device 60 from the set moving plan.

The pairing unit 44 establishes the communication means (see N1, N2 in FIG. 1) that enable direct communication between the external device 60 identified by the device identification unit 42 and the mobility support device 10

(white cane 1). Specifically, the pairing unit 44 pairs the external device 60 with the mobility support device 10 using the Bluetooth (registered trademark) standard, and establishes inter-device direct communication. Each external device 60 is also provided with a communication interface similar to that of the mobility support device 10.

The pairing unit 44 detects the link key included in a radio wave signal transmitted from the external device 60, and determines whether the detected link key corresponds to the external device 60 identified by the device identification unit 42. When the pairing unit 44 determines that the link key corresponds to the external device 60, the link key of the mobility support device 10 is transmitted to the external device 60 that transmits the link key. This establishes encrypted direct communication between the mobility support device 10 and the external device 60 using a session key generated based on the link key exchanged between the mobility support device 10 and the external device 60.

The support information generation unit 46 generates support information for supporting mobility of the visually impaired user P when the user P is moving to the destination based on the set moving plan. When the support information generation unit 46 can connect to a public network using the communication means via the base station by the first communication interface 20, the support information generation unit 46 acquires map information or the like from an external server connected via the network. Then, the support information is generated in consideration of the map information acquired from the external server, the position information of the user P acquired by the GPS device 28, and information acquired from the camera 30 and a peripheral information detection sensor mounted on the white cane 1.

Further, the support information generation unit 46 generates the support information for supporting mobility of the user P based on the information received from the external device 60 when the direct communication between the mobility support device 10 and the external device 60 is established based on the Bluetooth function. For example, the support information generation unit 46 receives radio wave transmitted from the external device 60, and generates information such as the distance and the direction of the external device 60 with respect to the mobility support device 10 and the installation location of the external device 60 as the support information based on the strength of the received radio wave and the information contained in the radio wave.

The output unit 48 outputs the support information generated by the support information generation unit 46 to the output device 32, and notifies the user P of the support information. For example, the output unit 48 may notify the user P of the support information by vibrating the vibrating element in a specific vibration pattern corresponding to the generated support information. Alternatively, the target user P may be notified of various types of information by outputting an audio signal or a message from the speaker.

The user information transmission unit 50 transmits information related to the user P to the external device 60 after the direct communication between the mobility support device 10 and the external device 60 is established. The user information includes, for example, information on the physical disability of the user P and information on the intention indicated by the user P that the user P uses the moving route on which the external device 60 is installed. With the above, it is possible to notify the external device 60 of consideration required for the user P and that the user P moves along the route on which the external device 60 is present. The user information may be transmitted from the mobility support device 10, and another support information may be output from the output device of the external device 60 that has received the transmitted user information.

The deletion unit 52 deletes the link key of the external device 60 stored in the mobility support device 10 after the user P arrives at the destination based on the moving plan set by the moving plan setting unit. With the above, it is necessary to establish direct communication again with the external device 60 of which the link key has been deleted once by the function of the pairing unit 44. Therefore, it is possible to avoid automatic connection between the mobility support device 10 and the external device 60 on the moving route used in the past.

Effect

Next, the effect of the present embodiment will be described.

Support Process

Figure 5:
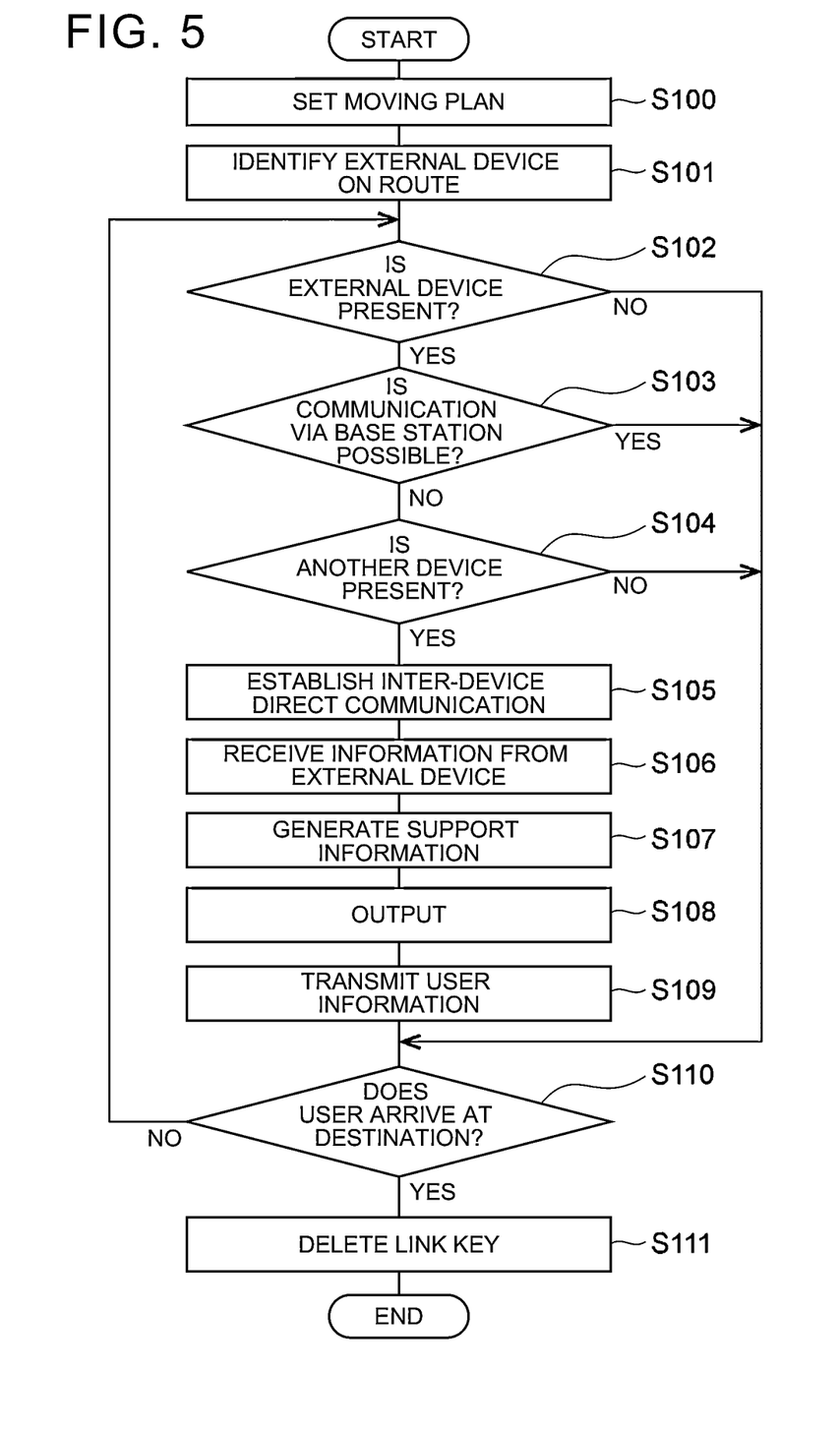
FIG. 5 is a flowchart showing an example of a support process according to the present embodiment.

FIG. 5 is a flowchart showing an example of a support process in which the mobility support device 10 supports mobility of the user P by direct communication between the mobility support device 10 and the external device 60.

As shown in FIG. 5, in step S100, the CPU 12 sets the moving plan based on the function of the moving plan setting unit 40. For setting of the moving plan, the moving plan is set by selecting one moving plan from among the moving plans registered in advance in the mobility support device 10 as the user P operates the operation unit provided for the white cane 1.

The moving plan is a plan that defines the moving route of the user P, for example, the user P walks from home to the nearest station, gets on a bus vehicle 2 at the bus terminal of the station, and gets off the bus vehicle 2 at the fifth bus stop to reach the destination. Further, the moving plan includes information related to the link key that is the identification information of each external device 60 present on the moving route. The external device 60 is mounted on, for example, the traffic light 3 installed on the route from home to the nearest station along which the user P walks, or the bus vehicle 2 that moves along the moving route from the nearest station to the destination.

When the user P sets the moving plan, the user P starts moving toward the destination. At this time, the Bluetooth function executed by the pairing unit 44 is in the ON state. In the ON state of the Bluetooth function, the mobility support device 10 detects a radio wave signal transmitted from a device that is also provided with the Bluetooth function via the second communication interface 22. According to the Bluetooth standard, it is possible to detect a radio wave signal transmitted from the external device 60 present within a few meters to a few tens of meters from the mobility support device 10 corresponding to Class.

In step S101, the CPU 12 identifies a plurality of the external devices 60 present on the moving route of the user P based on the moving plan set by the function of the device identification unit 42. Specifically, the CPU 12 identifies the external device 60 by acquiring information related to the link key of each external device 60 from the set moving plan. The information related to the link key is the link ley of the external device 60 or information that can identify the link key of the external device 60.

In step S102, the CPU 12 determines whether the external device 60 is present within the device detection range based on the Bluetooth function of the mobility support device 10. Specifically, the CPU 12 detects a radio wave signal transmitted from the external device 60 via the second communication interface 22, and determines whether the link key included in the detected radio wave signal matches the link key of the external device 60 present on the moving route of the user P. When the CPU 12 determines that the detected link key corresponds to the external device 60 present on the moving route of the user P, the CPU 12 determines that the external device 60 with which the inter-device direct communication needs to be performed is present, and proceeds to a process in step S103. On the other hand, when the CPU 12 determines that the detected link key does not correspond to the external device 60 present on the moving route of the user P, the CPU 12 proceeds to the process in step S110.

In step S103, the CPU 12 determines whether the mobility support device can establish the communication means (second communication means) via the base station by the function of the pairing unit 44. The scene where the communication means via the base station cannot be established is a scene where the radio wave from the base station is unstable or interrupted because the user P is moving to a location where the radio wave from the base station located on the ground is difficult to receive, for example, an underground location. The CPU 12 proceeds to step S104 when the CPU 12 determines that the communication means via the base station cannot be established. On the other hand, when the CPU 12 determines that the communication means via the base station is established, the CPU 12 can generate support information for supporting mobility of the user P based on the information acquired from the external server. Therefore, the CPU 12 proceeds to the process in step S110 without establishing the inter-device communication means.

In step S104, the CPU 12 determines whether a device related to another moving route is present around the external device 60 present on the moving route of the user P based on the function of the pairing unit 44. Specifically, the CPU 12 determines whether a device different from the external device 60 is present within the device detection range based on the Bluetooth function of the mobility support device 10.

When the link key of the device other than the external device 60 present on the moving route of the user is included in the link keys included in the radio wave signal detected via the second communication interface 22, the CPU 12 determines that another device is present. For example, when the bus vehicle 2 scheduled to be used by the user P is present among a plurality of the bus vehicles 2 stopped at the bus terminal, the mobility support device 10 detects radio wave signals transmitted from the bus vehicles 2 in addition to the bus vehicle 2 scheduled to be used by the user P. In such a situation, it is difficult for the visually impaired user P to make a determination to take a correct bus to be used.

When the CPU 12 determines that another device is present around the external device 60 present on the moving route of the user P, the CPU 12 proceeds to the process in step S105. On the other hand, when the CPU 12 determines that another device is not present, the CPU 12 proceeds to the process in step S110 without establishing the inter-device direct communication means.

In step S105, the CPU 12 establishes communication means (performs pairing) for performing inter-device direct communication by the function of the pairing unit 44 between the mobility support device 10 and the external device 60 present on the moving route of the user P. Specifically, the link key of the mobility support device 10 is transmitted to the external device 60 via the second communication interface 22, both of the link keys exchanged between the mobility support device 10 and the external device 60 are stored, and the function key is generated from the stored link keys.

In step S106, the CPU 12 receives information (radio wave signal) transmitted from the external device 60 paired via the second communication interface 22 by the function of the support information generation unit 46. The radio wave signal includes the function key that enables inter-device encrypted communication and device information unique to each external device 60. For example, the device information of the external device 60 mounted on the bus vehicle 2 includes operation information of the bus vehicle 2 on which the external device 60 is mounted.

In step S107, the CPU 12 generates, by the function of the support information generation unit 46, the support information for supporting mobility of the user P based on the information received from the external device 60. Specifically, the CPU 12 generates the operation information related to the bus vehicle 2 scheduled to be used by the user P as the support information based on the received device information. Further, the CPU 12 estimates the direction and distance of the external device 60 with respect to the mobility support device 10 based on the strength of the radio wave signal received from the external device 60, and generates the support information when the user P gets on the bus vehicle 2 or gets off the bus vehicle 2 based on the information above.

In step S108, the CPU 12 outputs the generated support information to the output device 32 by the function of the output unit 48. Specifically, the support information is output in a vibration pattern of the vibrating element included in the output device 32 and using voice information output from the speaker.

In step S109, the CPU 12 transmits information related to the user (user information) to the paired external device 60 by the function of the user information transmission unit 50. The user information includes, for example, information that the user P is a visually impaired person. With the above, when the external device 60 is mounted on the bus vehicle 2, it is possible to notify, via the external device 60, the bus vehicle 2 that the user P who is a visually impaired person uses the bus vehicle 2. When the user P is a person using a wheelchair, the information indicating that the user P uses a wheelchair may be transmitted as the user information. Further, when the user P is a hearing-impaired person, the information indicating that the user P is a hearing-impaired person may be transmitted as the user information.

In step S110, the CPU 12 determines whether the user P arrives at the destination. Whether the user P arrives at the destination may be determined by whether pairing is performed between the external device 60 installed at the destination and the mobility support device 10 of the user P, or based on the current position of the user P acquired from the GPS device 28. When the CPU 12 determines that the user P arrives at the destination, the CPU 12 proceeds to the process in the subsequent step S111. On the other hand, when the CPU 12 determines that the user P has not arrived at the destination, the process returns to the process in step S102.

In step S111, the CPU 12 deletes the link key of the external device 60 stored in the mobility support device 10 by the function of the deletion unit 52. With the above, it is possible to suppress the mobility support device 10 from being automatically connected to the external device 60 present on the route of the moving plan used in the past while the user is moving based on the moving plan set at a later date.

As described above, the mobility support device 10 according to the present embodiment identifies the external device 60 present on the moving route of the user P who is a target of support based on the set moving plan, and establishes the communication means N1, N2 (first communication means) that enable direct communication between the identified external device 60 and the white cane 1 (portable device) carried by the user. Specifically, according to the present embodiment, inter-device direct communication is established by pairing based on the Bluetooth (registered trademark) standard. Then, based on the information received from the external device 60 by the communication means N1, N2, the support information for supporting mobility of the user P is generated. Therefore, for example, it is possible to generate the support information by directly receiving the information corresponding to the contents of support from the external device 60 installed at a location where support for the user P is required (vehicles such as a bus and a train, traffic light, stairs, etc.) on the moving route of the visually impaired user P. With the above, it is possible to efficiently support mobility of the user P on the assumption of various situations.

Further, the communication means N1, N2 are short-range wireless communication means based on the Bluetooth (registered trademark) standard, and enable direct communication between the white cane 1 (mobility support device 10) and the external device 60 present within a predetermined distance from the white cane 1. With the above, the support information for the user P can be generated at the point where the user P approaches the external device 60, whereby mobility of the user P can be supported at the optimum timing.

Further, according to the present embodiment, when the white cane 1 cannot establish the communication means (second communication means) via the base station, the white cane 1 performs pairing between the mobility support device 10 and the external device 60 to establish the communication means N1, N2. Specifically, the communication means via the base station is communication means capable of connecting to a public network via the base station corresponding to communication standards such as 5G, LTE, LTE-Advanced (4G), and 3G. That is, when the white cane 1 cannot use the public network, the inter-device direct communication is performed and the support information is generated. As a result, it is possible to efficiently support mobility of the user P on the assumption of a situation where the radio wave of the base station is difficult to receive, such as when the destination or the moving route of the user P is underground.

Furthermore, when a device related to another moving route is present around the external device 60 present on the moving route of the user P, direct communication with the external device 60 is established by pairing. Therefore, for example, when the moving route of the user P includes a point that intersects with another moving route, the support information can be generated by directly communicating with the external device 60 corresponding to the moving route of the user P. As a result, it is possible to efficiently support mobility of the user on the assumption of a situation where the user tends to take an erroneous route in the moving route.

Further, the external device 60 includes a device mounted on the vehicle 2 moving along the moving route of the user P, and can generate the support information for supporting the user P to get on or off the vehicle 2. Therefore, for example, it is possible to efficiently support mobility of the user on the assumption of a situation where the user moves using a vehicle of public transportation such as a bus or a train or a taxi.

Further, according to the present embodiment, when the direct communication between the white cane 1 and the external device 60 is established, the information (user information) related to the user P is transmitted to the external device 60. Specifically, according to the present embodiment, it is possible to notify the external device 60 that the user P who is a target of the mobility support is a visually impaired person. Therefore, it becomes possible to give consideration to mobility of the user via the external device 60 based on the transmitted information.

In pairing based on the Bluetooth (registered trademark) standard, inter-device direct communication is possible using the link key that is unique identification information exchanged between the external device 60 and the mobility support device 10 (white cane 1) and stored in both of the external device 60 and the mobility support device 10. Therefore, once the radio wave signal of the external device 60 of which the link key is exchanged with the mobility support device 10 is detected by the mobility support device 10, the mobility support device 10 and the external device 60 are automatically paired.

Therefore, according to the present embodiment, after the user P arrives at the destination based on the set moving plan, at least the link key stored in the mobility support device 10 (white cane 1) is deleted. With the above, it is possible to suppress the mobility support device 10 from being automatically connected to (paired with) the external device 60 on the route used in the past while the user P is moving along the moving route set at a later date. As a result, it is possible to efficiently support mobility of the user.

Supplementary Explanation

The mobility support device 10 according to the present embodiment has been described above. However, it is understood that the mobility support device 10 can be implemented in various modes without departing from the scope of the present disclosure. For example, in the above embodiment, the case where the user P who is a target of the support is a visually impaired person has been described. However, the present disclosure is not limited to this, and may be applied to support of mobility of a wheelchair user and support of mobility of a hearing-impaired user. In addition, the mobility support device 10 may support all users who move on foot or using a moving body.

Further, in the above embodiment, the portable device composed of the white cane 1 has been described. However, the portable device is not limited to this, and may be a terminal such as a smartphone or a tablet.

Further, in the above embodiment, multiple moving plans are registered (stored) in advance in the mobility support device 10. However, the present disclosure is not limited to this. For example, one destination may be selected from multiple destinations registered in the mobility support device 10, information on the selected destination and the position information of the user P (white cane 1) acquired by the GPS device 28 may be transmitted to the external server via the first communication interface 20, and the moving plan from the current position of the user P to the destination and its map information may be acquired from the external server.

Further, in the above embodiment, the output device that outputs the support information is configured by a vibrating element or a speaker connected to the white cane 1 by a wired method. However, the present disclosure is not limited to this. The output device only needs to be an output device connected to the portable device by a wired method or a wireless method. Therefore, for example, the output device may be an output device such as a wireless earphone connected to the mobility support device 10 (white cane 1) by a wireless method through pairing based on the Bluetooth (registered trademark) standard.

Further, in the above embodiment, an example in which the external device 60 is mounted on the vehicle 2 or the traffic light 3 has been described. However, the present disclosure is not limited to this, and the external device 60 may be installed in, for example, a bus stop, a station platform, stairs, a road with a pedestrian crossing, a public facility, a building, etc.

Further, the above embodiment adopts the configuration that, when the communication means (first communication means) performed via the base station cannot be established, the communication means (second communication means) performed by direct communication between the portable device and the external device is established. However, the present disclosure is not limited to this. The mobility of the user P may be supported by simultaneously using the communication means performed via the base station and the communication means performed by inter-device direct communication.

Further, in the above embodiment, the Bluetooth (registered trademark) standard is used as short-range wireless communication means for inter-device direct communication. However, the present disclosure is not limited to this, and communication standards such as ZigBee (registered trademark), ultra wide band (UWB), Bluetooth low energy (BLE), and the ad-hoc mode of WiFi may also be used.

Further, in the present embodiment, the configuration in which the mobility support device 10 is mounted on the white cane 1 that is a portable device has been described. However, a configuration in which the mobility support device 10 is not mounted on the portable device may also be adopted. Further, the configuration in which the external server has a part of the internal functions of the mobility support device 10 may also be adopted.

It should be noted that various processors other than the CPU may execute various processes executed by the CPU 21 when the CPU 21 reads the software (program) in the above embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor in this case. Further, the support process may be executed by one of these various processors, or a combination of two or more processors of the same type or different types (for example, a combination of FPGAs, a combination of a CPU and an FPGA, and the like). Further, the hardware structure of these various processors is, more specifically, an electric circuit in which circuit elements such as semiconductor elements are combined.

Further, in the above embodiment, the mode in which the program of the support process is stored (installed) in the ROM or the storage in advance has been described, but the present disclosure is not limited to this. The program may be stored in a storage medium such as a compact disc read-only memory (CD-ROM), a digital versatile disc read-only memory (DVD-ROM), and a universal serial bus (USB) memory to be provided. Further, the program may be downloaded from an external device via a network.

The flow of the support process described in the above embodiment is an example, and unnecessary steps may be deleted, new steps may be added, or the process order may be changed within a range that does not deviate from the gist.

What is claimed is:

1. A mobility support device comprising:
   a device identification unit that identifies an external device that is present on a moving route of a user who is a target of support based on a set moving plan;
   a pairing unit that establishes first communication means that enables direct communication between the identified external device and a portable device carried by the user, wherein the pairing unit establishes the first communication means when the portable device cannot establish second communication means that enables communication via a base station;
   a support information generation unit that generates support information for supporting mobility of the user based on information received from the external device by the first communication means; and
   an output unit that outputs the generated support information to an output device connected to the portable device by a wired method or a wireless method.

2. The mobility support device according to claim 1, wherein:
   the first communication means is short-range wireless communication means; and
   the pairing unit establishes the first communication means with the external device that is present within a predetermined distance from the portable device.

3. The mobility support device according to claim 1, wherein the pairing unit establishes the first communication means with the external device when a device related to another moving route is present around the external device present on the moving route of the user.

4. The mobility support device according to claim 1, wherein:
   the external device includes a device mounted on a vehicle traveling along the moving route of the user; and
   the support information generation unit is configured to be able to generate the support information for supporting the user when the user gets on or off the vehicle.

5. The mobility support device according to claim 1, wherein:
   the portable device is a white cane carried by a visually impaired person; and
   the support information generation unit generates the support information for supporting mobility of the visually impaired person.

6. The mobility support device according to claim 1, further comprising a user information transmission unit that transmits information related to the user to the external device when the first communication means is established.

7. The mobility support device according to claim 1, wherein:
   the first communication means is communication means that enables the direct communication between the external device and the portable device using a link key being unique identification information exchanged between the external device and the portable device and stored in both of the external device and the portable device; and
   the mobility support device further includes a deletion unit that deletes the link key stored in the portable device after the user arrives at a destination based on the moving plan.

8. An information processing method comprising:

identifying an external device that is present on a moving route of a user who is a target of support based on a set moving plan;

establishing first communication means that enables direct communication between the identified external device and a portable device carried by the user, wherein the first communication means is established when the portable device cannot establish second communication means that enables communication via a base station;

generating support information for supporting mobility of the user based on information received from the external device by the first communication means; and outputting the generated support information to an output device connected to the portable device by a wired method or a wireless method.

9. A non-transitory storage medium storing a program that causes a computer to:

identify an external device that is present on a moving route of a user who is a target of support based on a set moving plan;

establish first communication means that enables direct communication between the identified external device and a portable device carried by the user, wherein the first communication means is established when the portable device cannot establish second communication means that enables communication via a base station;

generate support information for supporting mobility of the user based on information received from the external device by the first communication means; and output the generated support information to an output device connected to the portable device by a wired method or a wireless method.

* * * * *